(12) United States Patent
Jager et al.

(10) Patent No.: US 12,083,929 B2
(45) Date of Patent: Sep. 10, 2024

(54) METHODS AND SYSTEMS FOR OPERATING BATTERY PACKS

(71) Applicant: ACCELERATED SYSTEMS INC., Waterloo (CA)

(72) Inventors: Willem Jager, Cambridge (CA); Tim Lambert, Los Angeles, CA (US); Andrew Flemming, Waterloo (CA)

(73) Assignee: ACCELERATED SYSTEMS INC., Waterloo (CA)

( * ) Notice: Subject to any disclaimer, the term of this patent is extended or adjusted under 35 U.S.C. 154(b) by 20 days.

(21) Appl. No.: 18/024,106

(22) PCT Filed: Aug. 26, 2021

(86) PCT No.: PCT/IB2021/057846
§ 371 (c)(1),
(2) Date: Mar. 1, 2023

(87) PCT Pub. No.: WO2022/053901
PCT Pub. Date: Mar. 17, 2022

(65) Prior Publication Data
US 2023/0311705 A1    Oct. 5, 2023

(51) Int. Cl.
*B60L 58/21*     (2019.01)
*B60L 50/60*     (2019.01)
(Continued)

(52) U.S. Cl.
CPC .............. *B60L 58/21* (2019.02); *B60L 50/60* (2019.02); *B60L 58/12* (2019.02); *B60L 7/10* (2013.01);
(Continued)

(58) Field of Classification Search
CPC .......... B60L 58/21; B60L 50/60; B60L 58/12; B60L 7/10; B60L 2240/547; B60L 2249/549; B60L 2259/28
See application file for complete search history.

(56) References Cited

U.S. PATENT DOCUMENTS

2016/0291683 A1   10/2016   Kacker et al.
2018/0175648 A1   6/2018    Stickel

FOREIGN PATENT DOCUMENTS

CN   107769328 A     3/2018
JP   2008141827 A    6/2008
(Continued)

OTHER PUBLICATIONS

International Search Report and Written Opinion issued on Dec. 2, 2021 in relation to PCT/IB2021/057846.

*Primary Examiner* — Robert L Deberadinis
(74) *Attorney, Agent, or Firm* — Nyssa Inc.

(57) ABSTRACT

There are provided methods and systems for operating battery packs. One example method includes obtaining voltages of batteries of the battery pack, which includes a plurality of the batteries connected to a circuit. The method also includes obtaining an output current to be output from the battery pack and selecting a subset of the batteries capable collectively of providing the output current. The subset includes one or more selected batteries selected from among the plurality of the batteries. The subset has a subset voltage being substantially similar to a voltage of each of the selected batteries. The subset may be selected such that the selected batteries have substantially similar voltages and the subset voltage is maximized. The method also includes drawing the output current from the subset of the batteries. Other methods and systems for operating a battery pack are also provided.

34 Claims, 8 Drawing Sheets

(51) Int. Cl.
*B60L 58/12* (2019.01)
*B60L 7/10* (2006.01)
(52) U.S. Cl.
CPC ... *B60L 2240/547* (2013.01); *B60L 2240/549* (2013.01); *B60L 2250/28* (2013.01)

(56) References Cited

FOREIGN PATENT DOCUMENTS

| | | | |
|---|---|---|---|
| KR | 20170140640 | A | 12/2017 |
| WO | 2015012769 | A1 | 1/2015 |
| WO | 2017117400 | A1 | 7/2017 |
| WO | 2018036970 | A1 | 3/2018 |
| WO | 2018086142 | A1 | 5/2018 |
| WO | 2018095039 | A1 | 5/2018 |

400

Obtaining voltages of batteries of a battery pack comprising a plurality of the batteries connected to a circuit
405

Obtaining an input current to be used to charge one or more of the batteries
410

Selecting a subset of the batteries having a subset voltage, the subset comprising one or more selected batteries selected from among the plurality of the batteries, the subset voltage being substantially similar to the voltage of each of the selected batteries, the subset selected such that the selected batteries have substantially similar voltages
415

Directing at least a portion of the input current to the subset of the batteries to charge the selected batteries
420

Fig. 4

METHODS AND SYSTEMS FOR OPERATING BATTERY PACKS

CROSS-REFERENCE TO RELATED APPLICATION

This application claims priority from U.S. Provisional Patent Application No. 63/075,911, filed on Sep. 9, 2020, which is incorporated herein by reference in its entirety.

FIELD

The present specification relates to methods and systems for operating batteries, and in particular to methods and systems for operating battery packs.

BACKGROUND

Some powered devices may be powered by electricity. Such devices may be described as electric devices. Electric devices may use electrical energy to perform their functions. In some such devices, the electrical energy may be provided by one or more batteries.

SUMMARY

According to an implementation of the present specification there is provided a method of operating a battery pack, the method comprising: obtaining voltages of batteries of the battery pack, the battery pack comprising a plurality of the batteries connected to a circuit; obtaining an output current to be output from the battery pack; selecting a subset of the batteries capable collectively of providing the output current, the subset comprising one or more selected batteries selected from among the plurality of the batteries, the subset having a subset voltage being substantially similar to a voltage of each of the selected batteries, the subset selected such that the selected batteries have substantially similar voltages and the subset voltage is maximized; and drawing the output current from the subset of the batteries.

The output current may correspond to a throttle input received at an electric vehicle powered by the battery pack; and the obtaining the output current may comprise obtaining the throttle input.

The drawing the output current from the subset of the batteries may comprise: dividing the output current by the number of the selected batteries in the subset to yield a portion of the output current to be drawn from each selected battery; and drawing the portion of the output current from each selected battery.

The drawing the output current from the subset of the batteries may comprise: obtaining a discharge rate of each selected battery as a function of current drawn from each selected battery; and apportioning the output current between the selected batteries to maintain the discharge rates of the selected batteries substantially equal to one another.

The drawing the output current from the subset of the batteries may alter the subset voltage to an altered subset voltage; and the battery pack may comprise one or more non-selected batteries different from the selected batteries; the method may further comprise: comparing corresponding voltages of the one or more non-selected batteries to the altered subset voltage; and adding the one or more non-selected batteries to the subset if the corresponding voltages of the one or more non-selected batteries is substantially equal to the altered subset voltage.

The method may further comprise: detecting a change in the output current; and modifying a number of the selected batteries included in the subset of the batteries based on the change.

The voltage of each of the selected batteries may comprise a corresponding virtual voltage; and the method may further comprise: for each of the selected batteries, generating the virtual voltage based on an open circuit voltage for the selected battery and changes to the open circuit voltage caused by drawing a corresponding portion of the output current from the selected battery.

According to another implementation of the present specification there is provided a method of operating a battery pack, the method comprising: obtaining voltages of batteries of the battery pack, the battery pack comprising a plurality of the batteries connected to a circuit; obtaining an input current to be used to charge one or more of the batteries; selecting a subset of the batteries having a subset voltage, the subset comprising one or more selected batteries selected from among the plurality of the batteries, the subset voltage being substantially similar to a voltage of each of the selected batteries, the subset selected such that the selected batteries have substantially similar voltages; and directing at least a portion of the input current to the subset of the batteries to charge the selected batteries.

The selecting the subset of the batteries may comprise selecting the subset of the batteries such that the subset voltage is minimized.

The subset may comprise a plurality of the selected batteries; and the directing at least the portion of the input current to the subset of the batteries may comprise apportioning the portion of the input current about equally among the selected batteries.

The directing at least the portion of the input current to the subset of the batteries may comprise: obtaining a charging rate of each selected battery as a function of current directed to each selected battery; and apportioning the input current between the selected batteries to maintain the charging rates of the selected batteries substantially equal to one another.

The method may further comprise: directing a remainder portion of the input current to one or more additional selected batteries of the battery pack, the additional selected batteries having corresponding voltages being next lowest after the subset voltage among the batteries of the battery pack.

The directing the portion of the input current to the subset of the batteries may alter the subset voltage to an altered subset voltage; and the battery pack may comprise one or more non-selected batteries different from the selected batteries; the method may further comprise: comparing corresponding voltages of the one or more non-selected batteries to the altered subset voltage; and adding the one or more non-selected batteries to the subset if the corresponding voltages of the one or more non-selected batteries is substantially equal to the altered subset voltage.

The battery pack may be used to power an electric vehicle; and the directing at least the portion of the input current to the subset of the batteries may comprise directing at least the portion of the input current associated with one or more of regenerative braking or charging associated with the electric vehicle.

The voltage of each of the selected batteries may comprise a corresponding virtual voltage; and the method may further comprise: for each of the selected batteries, generating the virtual voltage based on an open circuit voltage for the selected battery and changes to the open circuit voltage caused by directing a corresponding portion of the input current into the selected battery.

The battery pack may be to power an electrical device having a minimum functionality; the subset of the batteries may comprise a first group of the batteries and a second group of the batteries, the first group selected such that when charged the first group is to power the electrical device to perform the minimum functionality; and the directing the portion of the input current to the subset of the batteries may comprise directing the portion of the input current to the first group first to charge the first group and then directing the portion of the input current to the second group.

The battery pack may be to power an electrical device having a minimum functionality; the selecting the subset of the batteries may comprise selecting the subset of the batteries such that: when charged the selected batteries are to power the electrical device to perform the minimum functionality; the number of the selected batteries is minimized; and the subset voltage is maximized.

According to yet another implementation of the present specification there is provided a controller for controlling operation of a battery pack, the controller comprising: a memory to store instructions executable by a processor; and the processor in communication with the memory, the processor to: obtain voltages of batteries of the battery pack, the battery pack comprising a plurality of the batteries connected to a circuit; obtain an output current to be output from the battery pack; select a subset of the batteries capable collectively of providing the output current, the subset comprising one or more selected batteries selected from among the plurality of the batteries, the subset having a subset voltage being substantially similar to a voltage of each of the selected batteries, the subset selected such that the selected batteries have substantially similar voltages and the subset voltage is maximized; and draw the output current from the subset of the batteries.

The output current may correspond to a throttle input received at an electric vehicle powered by the battery pack; and to obtain the output current the processor may be to obtain the throttle input.

To draw the output current from the subset of the batteries the processor may be to: divide the output current by the number of the selected batteries in the subset to yield a portion of the output current to be drawn from each selected battery; and draw the portion of the output current from each selected battery.

To draw the output current from the subset of the batteries the processor may be to: obtain a discharge rate of each selected battery as a function of current drawn from each selected battery; and apportion the output current between the selected batteries to maintain the discharge rates of the selected batteries substantially equal to one another.

The drawing the output current from the subset of the batteries may alter the subset voltage to an altered subset voltage; and the battery pack may comprise one or more non-selected batteries different from the selected batteries; and the processor may be further to: compare corresponding voltages of the one or more non-selected batteries to the altered subset voltage; and add the one or more non-selected batteries to the subset if the corresponding voltages of the one or more non-selected batteries is substantially equal to the altered subset voltage.

The processor may be further to: detect a change in the in the output current; and modify a number of the selected batteries included in the subset of the batteries based on the change.

The voltage of each of the selected batteries may comprise a corresponding virtual voltage; and the processor may be further to: for each of the selected batteries, generate the virtual voltage based on an open circuit voltage for the selected battery and changes to the open circuit voltage caused by drawing a corresponding portion of the output current from the selected battery.

According to yet another implementation of the present specification there is provided a controller for controlling operation of a battery pack, the controller comprising: a memory to store instructions executable by a processor; and the processor in communication with the memory, the processor to: obtain voltages of batteries of the battery pack, the battery pack comprising a plurality of the batteries connected to a circuit; obtain an input current to be used to charge one or more of the batteries; select a subset of the batteries having a subset voltage, the subset comprising one or more selected batteries selected from among the plurality of the batteries, the subset voltage being substantially similar to a voltage of each of the selected batteries, the subset selected such that the selected batteries have substantially similar voltages; and direct at least a portion of the input current to the subset of the batteries to charge the selected batteries.

To select the subset of the batteries the processor may be to select the subset of the batteries such that the subset voltage is minimized.

The subset may comprise a plurality of the selected batteries; and to direct at least the portion of the input current to the subset of the batteries the processor may be to apportion the portion of the input current about equally among the selected batteries.

To direct at least the portion of the input current to the subset of the batteries the processor may be to: obtain a charging rate of each selected battery as a function of current directed to each selected battery; and apportion the input current between the selected batteries to maintain the charging rates of the selected batteries substantially equal to one another.

The processor may be further to: direct a remainder portion of the input current to one or more additional selected batteries of the battery pack, the additional selected batteries having corresponding voltages being next lowest after the subset voltage among the batteries of the battery pack.

The directing the portion of the input current to the subset of the batteries may alter the subset voltage to an altered subset voltage; and the battery pack may comprise one or more non-selected batteries different from the selected batteries; and the processor may be further to: compare corresponding voltages of the one or more non-selected batteries to the altered subset voltage; and add the one or more non-selected batteries to the subset if the corresponding voltages of the one or more non-selected batteries is substantially equal to the altered subset voltage.

The battery pack may be used to power an electric vehicle; and to direct at least the portion of the input current to the subset of the batteries the processor may be to direct at least the portion of the input current associated with one or more of regenerative braking or charging associated with the electric vehicle.

The voltage of each of the selected batteries may comprise a corresponding virtual voltage; and the processor may be further to: for each of the selected batteries, generate the virtual voltage based on an open circuit voltage for the selected battery and changes to the open circuit voltage caused by directing a corresponding portion of the input current into the selected battery.

The battery pack may be to power an electrical device having a minimum functionality; the subset of the batteries may comprise a first group of the batteries and a second group of the batteries, the first group selected such that when charged the first group is to power the electrical device to perform the minimum functionality; and to direct the portion of the input current to the subset of the batteries the processor may be to direct the portion of the input current to the first group first to charge the first group and then directing the portion of the input current to the second group.

The battery pack may be to power an electrical device having a minimum functionality; to select the subset of the batteries the processor may be to select the subset of the batteries such that: when charged the selected batteries are to power the electrical device to perform the minimum functionality; the number of the selected batteries is minimized; and the subset voltage is maximized.

BRIEF DESCRIPTION OF THE DRAWINGS

Some example implementations of the present specification will now be described with reference to the attached Figures, wherein:

FIG. 4 shows a flowchart of another example method of operating a battery pack, in accordance with a non-limiting implementation of the present specification.

DETAILED DESCRIPTION

Unless the context requires otherwise, throughout this specification the word "comprise" and variations thereof, such as, "comprises" and "comprising" are to be construed in an open, inclusive sense, that is as "including, but not limited to."

As used in this specification, the singular forms "a," "an," and "the" include plural referents unless the content clearly dictates otherwise. It should also be noted that the term "or" is generally employed in its broadest sense, that is as meaning "and/or" unless the content clearly dictates otherwise.

Batteries may be used to provide electrical power to electric devices. Two or more batteries may be connected together or connected to a common circuit to form a battery pack. Such a battery pack may provide capacity or performance that are enhanced compared to those of its constituent batteries. Because the constituent batteries in a battery pack are directly or indirectly electrically connected to one another, differences in the characteristics or state of the constituent batteries may cause parasitic interactions between the constituent batteries that may be detrimental to the constituent batteries or the battery pack as a whole.

These parasitic interactions between dissimilar constituent batteries may limit the ability of the battery pack to incorporate or accommodate constituent batteries of different characteristics. Examples of such battery characteristics may include the underlying chemistry, the state of charge, age, dynamic characteristics such as discharging or charging rates, and the like. These limits, in turn, restrict the ability of an operator of an electrical device to add or remove constituent batteries of the battery pack either in preparation for, or during, the operation of the electrical device.

Figure 1:
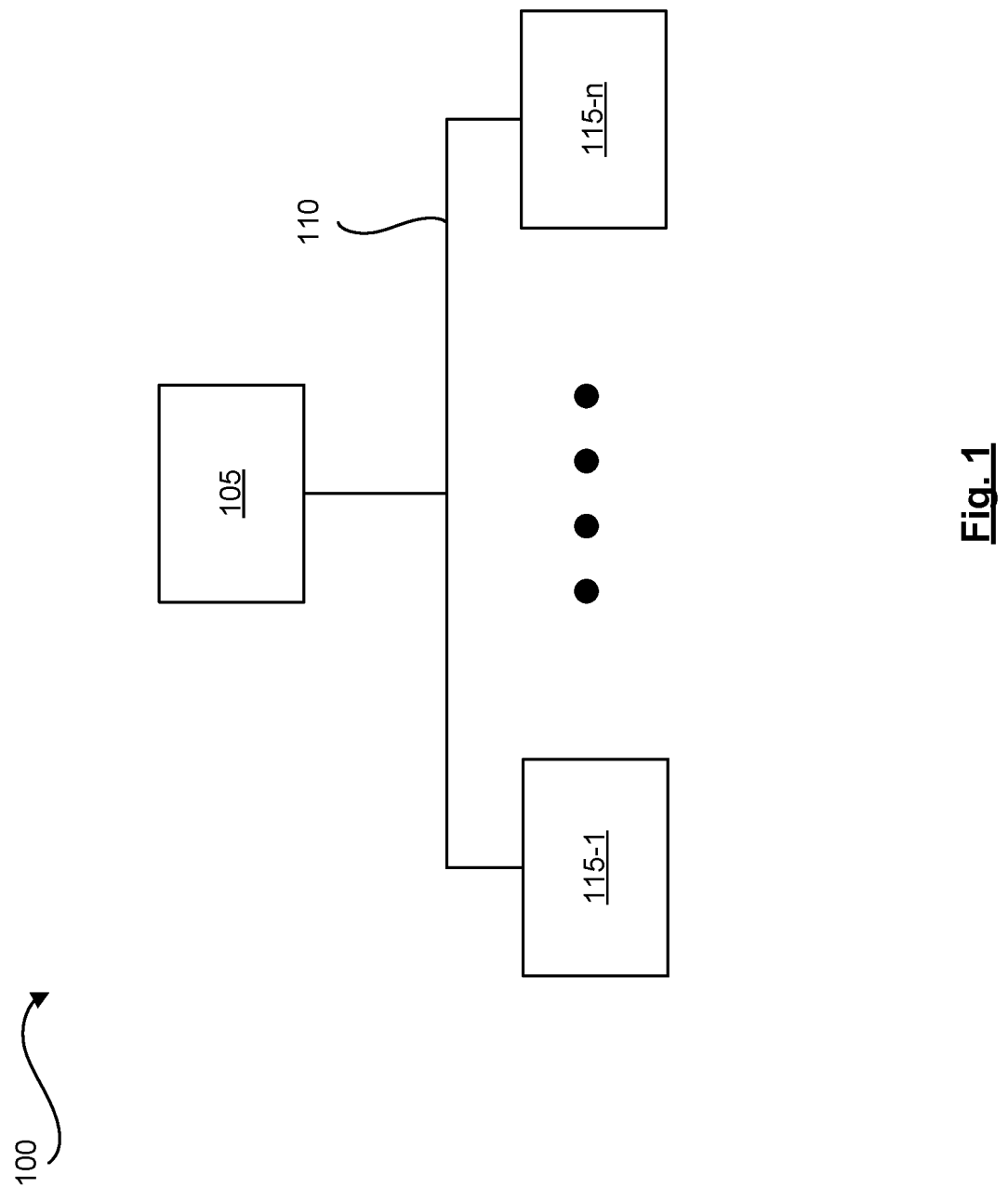
FIG. 1 shows a schematic representation of an example battery pack, in accordance with a non-limiting implementation of the present specification.

FIG. 1 shows a schematic representation of an example battery pack 100 with the ability to incorporate or accommodate dissimilar constituent batteries. In this description, constituent batteries may also be referred to as "batteries" in short. Battery pack 100 comprises a controller 105 and a plurality of batteries 115-1 to 115-$n$ all connected to a circuit 110. In some examples n may be a natural number greater than or equal to two. Batteries 115-1 to 115-$n$ may also be referred to collectively or generically as batteries 115.

Controller 105 may control the operating current to which batteries 115 are subjected. Batteries 115 being subjected to an operating current may comprise current being drawn from batteries 115 in the process of discharging batteries 115, or current being sent to or stored in batteries 115 in a process of charging batteries 115. It is contemplated that in some examples, controller 105 may also perform functions other than controlling the operating current to which batteries 115 are subjected.

In some examples, circuit 110 may comprise an electrical conduit to carry both low power signals between controller 105 and batteries 115 as well as higher power operating current to and from battery pack 100. The low power signals may be used to power low power loads on circuit 110. Examples of such low power loads may include sensors, processors, and the like (not shown in FIG. 1). In some examples, controller 105 may also be an example of a low power load. These low power signals may also be used by controller 105 to control batteries 115. The higher power operating current may be used to power the relatively higher power loads on circuit 110 (also not shown in FIG. 1). Examples of such higher power loads may include electric actuators, electric heaters, and the like. Moreover, examples of electric actuators may include electric motors, servos, and the like.

Moreover, in some examples, the electrical conduit of circuit 110 may comprise two separate conduits for the low power signals and the high power current respectively. For example, circuit 110 may comprise a CAN-BUS to connect the components of battery pack 100. A CAN-BUS may comprise separate electrical conduits for the low power signals and the higher power operating current. In this manner, the use of the CAN-BUS may allow the low power conduits to remain open to power the low power loads and to allow for the passage of control signals, while allowing for gating the higher power conduit independently of the low power conduit. Gating the higher power conduit may act as a safety feature against electrical shorts or power surges caused by or affecting batteries 115 or the loads on circuit 110.

Figure 2:
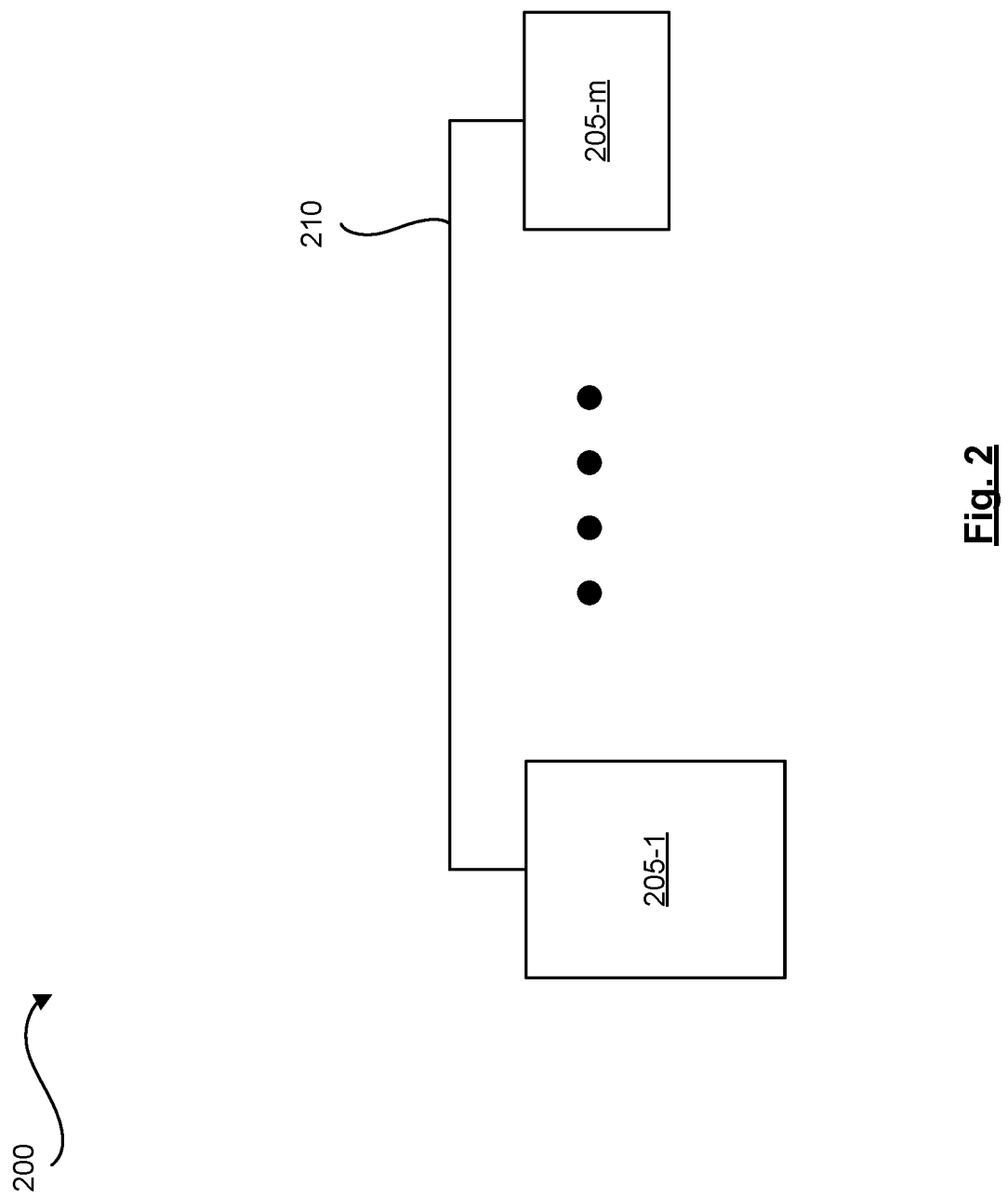
FIG. 2 shows a schematic representation of another example battery pack, in accordance with a non-limiting implementation of the present specification.

While FIG. 1 shows controller 105 as being a component separate from batteries 115, it is contemplated that in some examples the controller may be incorporated into one or more of the batteries of the battery pack. FIG. 2 shows a schematic representation of another example battery pack 200. Battery pack 200 may comprise a plurality of batteries 205-1 to 205-m connected to a circuit 210. In some examples m may be a natural number greater than or equal to two. Batteries 205-1 to 205-m may also be referred to collectively or generically as batteries 205. Circuit 210 may be similar to circuit 110.

Battery pack 200 may be similar to battery pack 100. A difference between battery packs 100 and 200 is that in battery pack 200 the controller or its functionality is incorporated into battery 205-1. The controller or controller functionality of battery pack 200 may be similar to controller 105 or its functionality. In examples where battery 205-1 has a Battery Management System (BMS), the controller may be a physical or functional component incorporated into this BMS. Moreover, in some examples the controller may be a device or functional module of battery 205-1 separate from a BMS.

In addition, while FIG. 2 shows the controller incorporated into one of the batteries of battery pack 200 (namely into battery 205-1), it is contemplated that in some examples the controller or its functionality may be added to more than one of the batteries of battery pack 200. Furthermore, in some examples, the controller or its functionality may be added to all of the batteries of battery pack 200.

Figure 3:
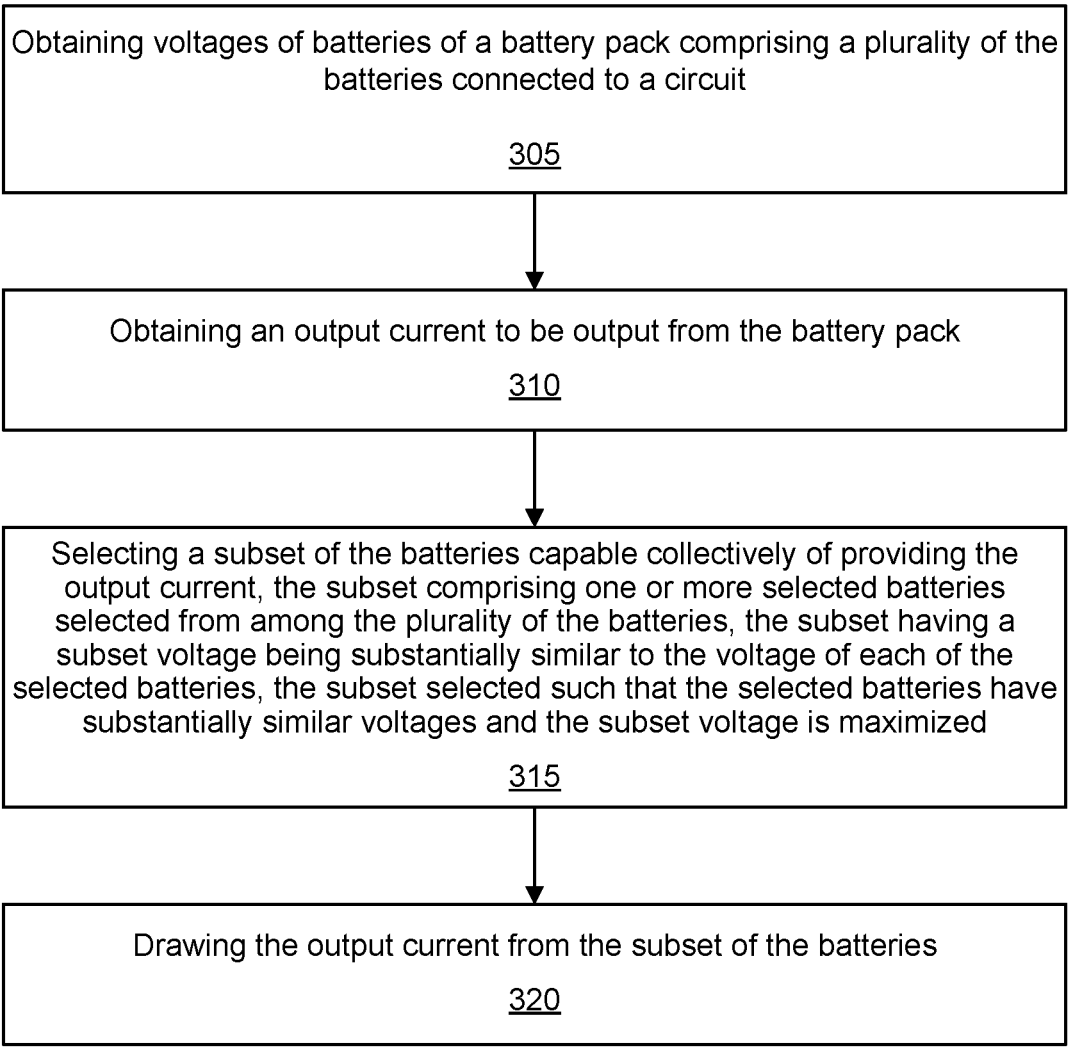
FIG. 3 shows a flowchart of an example method of operating a battery pack, in accordance with a non-limiting implementation of the present specification.

The controllers or the controller functions of the battery packs described herein may carry out charging methods, discharging methods, or other methods of operating the batteries that may allow the battery pack to incorporate or accommodate dissimilar batteries. FIG. 3 shows a flowchart of such an example method 300 which may be used to operate a battery pack comprising a plurality of batteries connected to a circuit. In some examples, method 300 may be carried out by a controller or a controller functionality of the battery pack. For example, method 300 may be carried out by controller 105 or the controller or controller functionality incorporated into battery 205-1.

The following description describes certain methods or functionalities in relation to a controller. It is contemplated that these methods or functionalities may also be performed by a device or system other than a dedicated or freestanding battery pack controller.

Method 300 may be used to output power or current from the battery pack. In other words, method 300 may be described as a method of discharging the battery pack. At box 305 voltages of the batteries of the battery pack may be obtained. In some examples, these voltages may have been provided in response to an inquiry sent out by the controller to the batteries. Moreover, in some examples, these voltages may be obtained by the controller actively sampling the status of the batteries. Furthermore, in some examples, the batteries may provide the voltages to the controller without active steps being taken by the controller.

In addition, while box 305 refers to obtaining voltages of the batteries, it is contemplated that in some examples a charge level status of the batteries may be obtained. Such a charge level status may indicate the level to which a battery has been charged or may indicate the amount of power stored in the battery. Furthermore, in some examples, such a charge level status may include the voltage and other parameters associated with a battery.

At box 310 an output current to be output from the battery pack may be obtained. This may provide an indication of the magnitude of the current or power that is being demanded of the battery pack. For example, if the battery pack is incorporated into an electric vehicle, the output current may be determined by the throttle input provided by an operator of the electric vehicle. In some examples, the output current may be obtained or received at the controller of the battery pack.

At box 315 a subset of the batteries of the battery pack may be selected. This subset may comprise one or more selected batteries selected from among a plurality of the batteries of the battery pack. This subset may be collectively capable of providing the output current. In some examples, this subset may comprise one selected battery which by itself is capable of providing the output current. Moreover, in some examples, this subset may comprise a plurality of selected batteries of the battery pack, which selected batteries together may be able to provide the output current.

This subset may have a subset voltage which is substantially similar to the voltage of each of the selected batteries. The subset may be selected such that the selected batteries have substantially similar voltages, and these similar voltages may be taken as the subset voltage. In examples where the voltages of the selected batteries are identical, the subset voltage may be the same as the voltage of the selected batteries. Moreover, in examples where the voltages of the selected batteries are similar but not identical, the subset voltage may be determined based on the voltages of the selected batteries. For example, the subset voltage may be calculated as the average of the voltages of the selected batteries.

In some examples, the voltages of the selected batteries being substantially similar may comprise the voltages of the selected batteries being within about 20% of one another. Moreover, in some examples, the voltages of the selected batteries being substantially similar may comprise the voltages of the selected batteries being within about 10% of one another. Furthermore, in some examples, the voltages of the selected batteries being substantially similar may comprise the voltages of the selected batteries being within about 5% of one another. In addition, in some examples, the voltages of the selected batteries being substantially similar may comprise the voltages of the selected batteries being within about 2% of one another. It is also contemplated that in some examples, the voltages of the selected batteries being substantially similar may comprise the voltages of the selected batteries being within about 1% of one another. The voltages of the selected batteries being within about X % of one another may comprise the voltages of any pair of batteries chosen from the selected batteries being within about X % of one another.

The subset may be selected such that the subset voltage is maximized in relation to the voltages of the batteries of the battery pack. For example, if the battery pack comprises one target battery that has a voltage that is higher than the voltage of the remaining batteries, and provided that the target battery is able to provide the output current, the selected subset may be a subset of one battery, namely the target battery. However, if the target battery alone is not capable of providing the output current, a different subset of selected batteries may be chosen. These selected batteries are able to provide the output current, and have substantially similar voltages that are lower than the voltage of the target battery but higher than the voltages of the remaining non-selected batteries of the battery pack.

In this manner, the batteries discharged first are the one or more batteries with the highest or near the highest voltages of the batteries of the battery pack. Moreover, the selected batteries in the subset are selected to have substantially similar voltages to reduce or eliminate parasitic interactions between the selected batteries. At box 320, the output current is drawn from the subset of the batteries. In some examples, the output current may be divided by the number of the selected batteries in the subset to yield the portion of the output current that is to be drawn from each individual selected battery within the subset.

Drawing an about equal portion of the output current from each of the selected batteries may allow each of these batteries to discharge at a comparable rate. This, in turn, may help to maintain the selected batteries at substantially similar voltages or states of charge, thereby reducing parasitic interactions between the selected batteries as the selected batteries become discharged in operation.

In some examples, as the selected batteries become discharged, the subset voltage may become substantially similar or equal to the voltage of one or more non-selected batteries. In other words, drawing the output current from the subset of the selected batteries may alter the subset voltage. This alteration may take the form of a reduction in the subset voltage. This altered voltage may also be referred to as an altered subset voltage. As the subset voltage of the selected batteries becomes altered and substantially closer or equal to the voltage of the non-selected batteries, those non-selected batteries may be added to the subset to increase the number of the selected batteries in the subset. As new batteries are added to the subset, the output current may be divided among a larger number of selected batteries, thereby reducing the portion of the output current drawn from each of the selected batteries. In this manner, as the output current is drawn from the subset of the selected batteries and the subset voltage drops, an increasing number of the batteries of the battery pack may be added to the subset of selected batteries.

In some examples, the magnitude of the output current demanded from the battery pack may change in operation. If the magnitude of the output current is reduced, the subset of the selected batteries may be modified to add a smaller number of target batteries at a higher voltage to replace a larger number of previously selected batteries that may have a voltage lower than the voltage of the target batteries. Similarly, if the magnitude of the output current increases, the subset of the selected batteries may be modified to add a larger number of target batteries at a lower voltage to replace a smaller number of previously selected batteries that may have a voltage higher than the voltage of the target batteries.

While the above examples describe dividing the output voltage equally among the selected batteries, it is contemplated that in some examples the division of the output current between the selected batteries may be unequal. For example, based on differences in the underlying chemistry, age, or other characteristics of the selected batteries, the voltage of the different selected batteries may drop at a different rate for a given amount of current drawn from those selected batteries. The rate at which the voltage of a given selected battery drops during operation may be described as the discharge rate of that selected battery. In such examples, the apportionment of the output current among the selected batteries may be adjusted to allow for the operating voltage of the selected batteries to drop at rates that are comparable or equal to one another. In other words, in such examples the apportionment of the output current among the selected batteries may be adjusted to allow the discharge rates of the selected batteries to be substantially comparable or equal to one another. Keeping the operating voltage of the selected batteries comparable or equal in operation may reduce or eliminate parasitic interactions between the selected batteries.

As the output current is apportioned or divided among the selected batteries of the battery pack each of the selected batteries may be assigned or allocated a nominal target current to contribute towards the output current. In some situations, the actual current drawn from a given selected battery in operation may exceed the nominal target current assigned to that given selected battery. For example, one or more of the selected batteries other than the given selected battery may discharge faster than the given selected battery in operation. As the voltages of the other selected batteries drop below the voltage of the given selected battery, some current may flow from the higher voltage given selected battery into the one or more other selected batteries with relatively lower voltages. This parasitic current flow between the selected batteries may increase the current being drawn from the given selected battery above the nominal target current. Such parasitic current flows may add to the nominal target current and push the actual current drawn from a given selected battery in operation above safety thresholds for the given selected battery.

In order to avoid exceeding the safety thresholds for the batteries of the battery pack, in some examples the methods of operating battery packs described herein may determine or otherwise account for possible parasitic current flows caused by nonuniform discharge rates among the batteries of the battery pack. Moreover, in some examples, a lookup table or a mathematical model may be used to determine or predict nonuniformity in discharge rates in order to account for parasitic current flows. For example, characteristics of the batteries may be used to look up or calculate the discharge rates and the possibility of parasitic current flows. Examples of such characteristics may include serial number of the batteries, the underlying chemistry of the batteries, age of the batteries, the operating current or voltage of batteries, the operating temperature of the batteries, and the like.

Furthermore, in some examples, a predictive model may be used to predict the discharge rates and correspondingly the possibility of parasitic current flows. In addition, in some examples, a machine learning model may be used to predict discharge rates. Once the possibility and the magnitude of parasitic current flows are determined, then the nominal target currents may be adjusted downwards such that the sum of the nominal target current and the parasitic current flows do not exceed the safety thresholds for the batteries of the battery pack.

In some battery types, discharging the battery below a given threshold may damage or otherwise undermine the performance of that battery. In some examples, discharging lithium-ion batteries below a threshold may undermine the performance of such batteries. In order to avoid discharging batteries below such thresholds, in some examples additional batteries may be added to the subset of the selected batteries to provide the output current while preventing the selected batteries from being discharged below their respective thresholds. Moreover, in some examples, the minimum discharge threshold may be enforced by the controller whereby the controller discontinues discharging the batteries of the battery pack if the threshold for discharging them is reached.

In some of the examples provided herein, the number of the selected batteries is described as being increased or decreased in certain situations. In order to increase the number of the selected batteries, more of the batteries of the battery pack may be chosen or designated as one of the selected batteries. In some examples, choosing or designating a given battery as selected may comprise subjecting that given battery to operating currents. Similarly, reducing the number of the selected batteries may comprise designating one or more of the selected batteries as unselected. In some examples, unselecting a given battery may comprise discontinuing subjecting that given battery to operating currents.

As described above, subjecting a battery pack to operating currents may also include sending current to or storing current in the batteries of the battery pack to charge those batteries. FIG. 4 shows a flowchart of an example method 400 of operating a battery pack. In some examples, method 400 may be used to charge the batteries of the battery pack. Charging the batteries of the battery pack may be used to replenish the power discharged from the battery pack during the operation of an electrical device powered by the battery pack. Moreover, in some examples charging the battery pack may be used to store power or current generated during the operation of the electrical device. In examples where the electrical device comprises an electric vehicle, electrical power or current may be generated during various operations of the electric vehicle such as regenerative breaking, and the like.

Similar to method 300, in some examples method 400 may also be performed by a controller or a controller function of the battery pack. Moreover, in some examples, a controller or controller function of a battery pack may perform method 300 and its related methods as well as method 400 and its related methods. At box 405 of method 400 voltages of the batteries of the battery pack may be obtained. Obtaining these voltages may be similar to obtaining the voltages of the batteries described in relation to box 305 of method 300.

At box 410, an input current to be directed towards one or more of the batteries of the battery pack may be obtained. In some examples, the magnitude of the input current may be communicated to the controller of the battery pack. Moreover, in some examples, the input current may be directed towards the battery pack whereby the battery pack may determine the magnitude of this input current.

At box 415, a subset of the batteries may be selected. The subset may have a subset voltage. The subset may comprise one or more selected batteries selected from among a plurality of the batteries of the battery pack. The subset voltage may be substantially similar to the voltage of each of the selected batteries. The subset may be selected such that the selected batteries have substantially similar voltages. Moreover, in some examples, the subset may be selected such that the subset voltage is minimized. Substantial similarity between the voltages of the selected batteries may be similar to that described in relation to box 315 of method 300. Moreover, the determination of the subset voltage may also be similar to the corresponding determination described in relation to method 300. At box 420, at least a portion of the input current is directed to the subset of the batteries to charge the selected batteries.

In some examples, minimizing the subset voltage may comprise selecting one or more of the batteries having substantially similar voltages, which voltages are the lowest among the voltages of the batteries of the battery pack. In this manner, the input current may be directed first to one or more batteries of the battery pack which have the lowest voltage or lowest state of charge.

If the selected batteries of the subset are able to store all of the input current, then all of the input current may be directed to the selected batteries. If, however, the selected batteries are not able to accommodate or store all of the input current, then a portion of the input current may be directed to the selected batteries. Moreover, in some examples, the selected batteries may have an optimal charging current or capacity which are below the maximum operating current or the maximum capacity of the selected batteries. In such examples, the determination of what portion of the input current is to be sent to the selected batteries may be based on the optimal charging current or capacity rather than the maximum operating current or the maximum capacity of the selected batteries.

In some examples, the subset may include one selected battery. Moreover, in some examples, the subset may include more than one selected battery. In examples where the subset includes one selected battery, the portion of the input current is directed to the selected battery to be stored in the selected battery. In examples where the subset includes more than one selected battery, the portion of the input current may be allocated or apportioned equally among the selected batteries.

It is also contemplated that in some examples, the portion of the input current may be apportioned unequally among the selected batteries. As discussed above in relation to method 300 and its related methods, in some examples the various selected batteries may be charged at different rates. These rates may also be referred to as charging rates. Directing an equal amount of current to such batteries may result in their being charged at different rates and having different voltages. Such differences in the voltages among the selected batteries may then cause parasitic current flows between the selected batteries during the charging of the battery pack. To avoid such parasitic current flows the portion of the input current may be apportioned among the selected batteries to take into account different charging rates of the selected batteries. For example, the input current may be apportioned between the selected batteries to maintain the charging rates of the selected batteries substantially equal to one another. This, in turn, may reduce or eliminate differences between the voltages or the states of charge of the selected batteries during the charging operation.

In some examples, if the selected batteries are able to accommodate or store only a portion of the input current, the remainder portion of the input current may be directed to one or more additional selected batteries which may have voltages or states of charge that are the next lowest in the battery pack compared to the voltages or states of charge of the selected batteries of the subset. In other words, the input current may be first directed to the one or more lowest charged batteries in the battery pack, and any portions of the input current that remain unused by the lowest charged batteries are then directed to the one or more next lowest charged batteries in the battery pack until all of the input current is allocated to the selected batteries of the battery pack.

In some examples, as the selected batteries with the lowest voltage or state of charge receive and store the input current, the voltage of the selected batteries may increase. In other words, directing the input current towards the subset of the selected batteries may alter the subset voltage. This alteration may take the form of an increase in the subset voltage. This altered voltage may also be referred to as an altered subset voltage. When the voltage of the selected batteries (i.e. the subset voltage) becomes altered or increases to become substantially similar or equal to the voltage of the next lowest voltage battery in the battery pack, the next lowest voltage battery may then be added to the subset as one of the selected batteries. The input current may then be apportioned among this increased number of the selected batteries.

Furthermore, in some examples, the batteries of the battery pack may have an optimal charging current or optimal charged voltage which may be lower than the maximum charging current or the maximum charged voltage of those batteries. In such examples, the portion of the input current directed towards the selected batteries, or the apportionment of the portion of the input current between the selected batteries, may be based on the optimal charging current or the optimal charged voltage instead of the maximum charging current or the maximum charged voltage of those selected batteries.

Moreover, in some examples, charging a given battery to close to its maximum charged voltage or capacity may reduce the speed of charging or undermine the ability of the battery to accommodate or store the portion of the input current apportioned to it. This may also be described as trickle charging. To avoid trickle charging, the charging rate or the charged voltage may be reduced from their maximums when charging the batteries of the battery pack.

Furthermore, in some examples, the available charging current apportioned among all the batteries in the battery pack may amount to a relatively small charging current per battery. Such a small charging current may charge each battery at a rate that may be below an optimal charging rate for that battery. In some such examples, a subset of the batteries may be selected and given priority for charging. Apportioning the charging current among the relatively smaller number of batteries in the subset may allow a relatively larger charging current per battery. This larger charging current may allow each battery in the subset to be charged at a relatively higher rate, closer to the optimal charging rate for each of the batteries.

In some examples, charging batteries of a battery pack beyond their optimal charged state, or for a long duration, may damage or otherwise degrade the performance of the batteries. To reduce the likelihood of such damage, the charge level of the batteries and the charging duration may be monitored, and charging may be discontinued if charge levels or charging durations exceed their optimal or maximum thresholds.

In addition, in some examples, the subset of the batteries to receive the input current may be selected to reduce or minimize the charging time needed to provide minimum functionality to the electrical device powered by the battery pack. For example, an electrical device powered by a battery pack may need a minimum voltage V and a minimum current I to become minimally functional. An example battery pack may have 10x batteries that have substantially similar voltages that are lowest among all the batteries of the battery pack. Charging the 10x batteries to voltage V may require 10H hours. If a first subset of the 10x batteries (e.g. 5x batteries) is sufficient to provide current I, then this first subset may be charged for 5H hours to be able to provide voltage V and current I to provide minimum functionality to the electrical device. The first subset of the selected batteries may also be described as a first group of the selected batteries. The remainder of the selected batteries may be described as a second group of the selected batteries. Once the first subset is charged, then the remainder of the 10x batteries may be charged for the subsequent 5H hours to complete the charging of the 10x batteries. In this manner, the electrical device becomes minimally functional earlier (i.e. in 5H hours) than if all of the 10x batteries were charged simultaneously requiring 10H hours before the electrical device is minimally functional. In the above description X and H are used as variables, and may take values such as natural numbers, and the like.

Minimum functionality may depend on the type of the electrical device. For example, in the case of an electrical golf cart, minimum functionality may comprise the ability to move or drive, but at a reduced maximum speed. Similarly, in the case of an electrical riding mower, minimum functionality may comprise the ability to drive but not mow, or to drive and mow at a reduced maximum rate. Other types and specifications of minimum functionality may also be used. Moreover, in some examples, minimum functionality may be a settable or configurable operating parameter for an electrical device. In some examples, minimum functionality may be a factory-set parameter of an electrical device. Furthermore, in some examples, minimum functionality may be set by an operator of the electrical device. In some examples, the operator may be fleet operator operating a fleet of electrical devices. In addition, in some examples, the operator may be an individual operator of the electrical device.

To further reduce the charging time to achieve minimum functionality, the subset of the batteries to receive the charging current may be selected such that when charged the selected batteries are able to power the electrical device to perform the minimum functionality, the number of the selected batteries is minimized, and the subset voltage is maximized. Minimizing the number of batteries in the subset of selected batteries reduces the number of batteries that need to be charged to achieve minimum functionality, thereby reducing the charging time to achieve minimum functionality. Similarly, maximizing the subset voltage of the subset of the selected batteries reduces the extent or amount of charging the selected batteries need to become charged, thereby also reducing the charging time to achieve minimum functionality.

The charging of the batteries and battery pack may also be tailored according to the characteristics and the operating conditions of the battery pack. Some example characteristics of the battery pack may include the underlying chemistry of the batteries of the battery pack, the age of such batteries, and the like. The operating conditions of the battery pack may include temperature, voltage or state of charge of each of the batteries, and the like. In addition, in some examples the charging or discharging of the batteries and battery pack may affect the temperature of those batteries. Charging or discharging currents or maximum/minimum voltages may be selected to maintain the batteries within their optimal operating temperature ranges.

As described above, in some examples the controllers or the controller functions described herein may be able to control a given battery of a battery pack by connecting or disconnecting the given battery, or by turning on or off the voltage or current directed to or drawn from the given battery. It is also contemplated that in some examples, the controller or the controller functions described herein may be able to control or adjust the voltage or current associated with the given battery in addition to on-off control over the voltage or current. For example, the controller or controller function may be able to adjust the effective voltage of a given battery between zero and the internal voltage of the battery. It is also contemplated that in some examples, the controller or controller function may be able to "up-convert" the voltage of a given battery to increase the effective voltage above the internal voltage of the battery.

In some examples, controlling the effective voltage of a battery between zero and its internal voltage may be implemented using Pulse-Width-Modulation (PWM) control signals associated with the controller(s) or the control function(s) of the batteries of a battery pack, of the battery pack itself, or of an electrical device powered by the battery pack. Furthermore, in some examples, the controller or the control function associated with adjusting the effective voltage (or current) of the batteries may comprise, or be implemented by, one or more BMSs of the batteries of a battery pack or of the battery pack itself.

The ability to control the effective voltage of a given battery may allow that given battery to interoperate with batteries of different voltages. For example, lowering the effective voltage of a given battery to below its internal voltage may allow that given battery to operate in a pack with other batteries of lower voltages. In other words, lowering the effective voltage of the given battery may allow that given battery to be selected as part of the subset of batteries in a battery pack, which subset may provide output current or receive input current during the operation of the battery pack.

In some examples, the given battery in a battery pack with the lowest voltage may be used to set the operating voltage of a battery pack, and the effective voltage of the remaining batteries of the pack may be lowered to match the voltage of the given battery. This may allow multiple or all of the batteries of the battery pack to contribute to the operation of the battery pack. In some examples, identifying the battery with the lowest voltage in a pack, and setting the initial operating voltage of the pack to that lower voltage, may be part of the start-up or initialization routine of the battery pack.

Moreover, in some examples, active balancing may be used to adjust the effective voltage of the batteries in a battery pack in operation. For example, such active balancing may be used to control higher-voltage packs to charge lower-voltage packs while the battery pack is in operation. This active balancing may allow for increasing the level of charge or voltage of the lower charged/voltage batteries in the pack, thereby increasing number of batteries in a battery pack that have a relatively higher voltage. This increased number, in turn, may allow the battery pack to have a larger output current, extended range or operating time, increased output power, increased lifetime, and the like.

In some examples, the ability to adjust the effective voltage of the batteries in a battery pack may also be used to implement gradual or "gentle" handoffs between various batteries of a battery pack. For example, when a higher-voltage or higher-charged battery is added to a battery pack to operate with or replace a lower-voltage or lower-charged battery, the effective voltage of the higher-voltage battery may be initially reduced to the voltage of the lower-voltage battery. This matching of voltages may allow the higher and lower charged batteries to operate together for some time, and may also avoid parasitic current flows from the higher-charged to the lower-charged battery. After some time, the lower-charged battery may go offline or otherwise be disconnected from the operation of the battery pack, and then the effective voltage of the higher-charged battery may be increased.

Furthermore, in some examples, such gradual handoffs may allow for on-the-fly switching between different groups of batteries of a battery pack as the load demand on the battery pack changes. Moreover, in some examples, such gradual handoffs may mitigate intermittent power availability, or may reduce the likelihood of spikes or unexpected behaviour in the battery pack caused by the sudden internal loading of the batteries. In some examples, such gradual handoffs may reduce variations in internal resistance of the batteries or of the battery pack, which variations may destabilize the output regulation or control of the battery pack.

In addition to controlling and adjusting the voltage or current to be output from the batteries of the battery pack, in some examples the current or voltage of the electrical power to be directed to the batteries may also be adjusted. For example, in this manner the charging of the batteries of a battery pack may be controlled. For example, charging may be stopped before a 100% charged state to avoid overcharging. In some examples, charging may be stopped at about a 95% charged state to avoid overcharging.

In addition, in some examples, in systems where different batteries may have different numbers of cells, or different chemistries, a determination may be made to limit the charge level of a given battery before the given battery reaches an unsafely-high level of charge. For example, such a battery may be disconnected from the battery pack before the given battery reaches a 100% state of charge. Moreover, in some examples, controlling the current directed into a given lower-charged battery may also be used to reduce or eliminate parasitic current flows from higher-charged batteries to the lower-charged batteries of a battery pack.

As described above in relation to methods 300, 400, and their related methods, the voltage of the given battery may be used to make determinations regarding charging or discharging that battery as part of the operation of the battery pack. Some of these determinations (e.g. whether to designate the given battery as a selected battery and subject it to operating currents) may be made before the given battery is subjected to operating currents. At this stage, the voltage of the given battery may be the open circuit voltage of that given battery. Once the given battery is subjected to operating currents, however, the actual operating voltage of that given battery may be different than the open circuit voltage of the given battery.

Divergences between the open circuit voltage and the operating voltage may cause a difference between the operating voltage of the given selected battery and the other selected batteries, thereby causing parasitic current flows between the given selected battery and the other selected batteries. To reduce or avoid such divergences and corresponding parasitic current flows, a virtual voltage may be determined for a given battery and be used as the basis for determining whether that given battery is to be subjected to operating currents.

In some examples, the virtual voltage may be an adjusted form of the open circuit voltage, whereby the adjustment is to take into account the changes to the open circuit voltage once the battery becomes subject to operating currents. In some examples, the resistance of the battery and the magnitude of the operating current may be used to calculate a predicted operating voltage for the battery. This resistance may also be described as the internal resistance of the battery. This operating voltage may then be designated or used as the virtual voltage for the battery. In some examples, current (I), voltage (V), and resistance (R) may be related to one another by the equation $V=IR$.

$V=IR$ describes a linear relationship. In operation, the relationship between voltage, current, and resistance of the battery may not be linear. To account for such nonlinearities, lookup tables or other empirically-generated data sets may be used to obtain the virtual voltage based on the anticipated or predicted operating parameters of the given battery. In addition, in some examples, the full range of anticipated operating currents may be divided into segments. Within each segment the relationship between voltage, current, and resistance may be approximated by a linear relationship similar to or the same as V=IR. This segmentation approach may allow for the use of multiple linear relationships to approximate the relationship between voltage, current, and resistance and to obtain the virtual voltage for the full range of the operating parameters of the battery.

Moreover, in some examples, a mathematical model may be used to generate predictions of the virtual voltage for a battery as a function of the operating conditions of that battery. Furthermore, in some examples, a machine learning model may be trained on a dataset of the voltages of the battery under various operating conditions. The trained machine learning model may then be used to generate predictions of the virtual voltage as a function of the operating parameters of the battery.

Methods 300 and 400, and their related methods described herein, may allow for the battery pack to accommodate and operate with constituent batteries of different characteristics such as voltages or states of charge, chemistries, age, charge or discharge rates, and the like. Being able to accommodate and operate with dissimilar constituent batteries may allow the battery pack and the electrical device powered by the battery pack to have greater operating flexibility. For example, adding additional constituent batteries to the battery pack may allow an operator to increase the operating time of the electrical device powered by the battery pack.

In examples where the electric device comprises an electric vehicle, increasing the operating time may translate to a longer range for the electric vehicle. Moreover, in examples where the electric device comprises a lawnmower, the increased operating time may translate to a larger area of lawn being mowed. Other types or examples of electric devices may also be used.

In addition, the battery packs and the methods of operating thereof described herein may allow for enhancements in the operating safety of the battery packs and the electrical devices powered by those battery packs. For example, the use of a CAN-BUS with separate electrical conduits for low-power signals and high-power operating currents may allow the batteries of the battery pack to ship or idle in a cold state. The cold state may comprise a state where the given battery of the battery pack is disconnected from the high-power conduits, while still providing power to the controllers and systems of the electrical device via the low-power conduit. This arrangement may reduce or eliminate the likelihood of high-power electrical shorts or accidental discharges that may damage the batteries or other loads on the circuit, or pose a hazard to operators of the electrical devices.

In some examples, one or more of the batteries of the battery pack may have one or more corresponding low-current, diode-protected, always-on outlets to connect to the low-power conduit to allow the batteries to power the low-power controllers and other low-power components on the circuit of the electrical device. Such outlets would not be able to output the higher currents or power levels that could lead to damaging or dangerous electrical shorts or other accidental discharges.

Once the controller on the circuit determines that it is appropriate or safe to subject the batteries of the battery pack to the high operating currents, the controller may enable or allow constituent batteries of the battery pack to connect to the high current/power conduits and be subjected to the relatively higher operating currents of the electrical device. In addition, in some examples, the controller of the battery pack may monitor the constituent batteries or the loads connected to the battery pack, and may disconnect the batteries from the high-power conduit in case of any malfunctions. Furthermore, in some examples, the controller of the battery pack may also monitor, or otherwise receive information about, any accidents or other potentially dangerous circumstances affecting the electrical device powered by the battery pack. The controller may then disconnect the batteries of the battery pack from the high-power conduit to avoid any electrical shorts or other accidental discharges.

The battery packs and the methods of operating thereof described herein may also allow for enhancing the lifetime or performance of the battery packs and by extension the performance of the electrical devices powered by those battery packs. For example, the controller of the battery pack may regulate the rate of charge/discharge or maximum or minimum thresholds for the charging or discharging of the constituent batteries of the battery pack. This, in turn, may enhance the performance or lifetime of the constituent batteries and of the battery pack.

Moreover, in some examples, the controller may designate or reserve some of the constituent batteries as backups. This may prevent the backup batteries from being discharged during regular operation of the electrical device powered by the battery pack. If the operating batteries of the battery pack become exhausted, then the backup batteries may be brought online and subjected to operating currents to allow the electrical device to continue operating until the operation of the operating batteries of the battery pack can be restored.

In addition, in some examples, the controllers or the controller functions described herein may be added to or implemented in existing battery packs as an addition or a retrofit. For example, the controllers or the controller functions described herein may be implemented in or as part of the BMS of existing batteries and battery packs. It is also contemplated that in some examples, the controllers or the controller functions described herein may be implemented as devices or functionalities that may be added to batteries or battery packs which lack existing BMSs.

Moreover, in some examples, the controllers described herein may allow for enhanced communication or feedback to an operator of an electrical device powered by the battery packs described herein. For example, a visual indicator may be used to indicate the quality or the operating state of the constituent battery in the battery pack. In some examples, the quality of the constituent battery may comprise characteristics of the battery such as the rate at which the battery is able to be charged or discharged, the amount of power that the battery is able to store, the underlying chemistry of the battery, and the like. Moreover, in some examples, the operating state of the constituent battery may include the voltage or a state of charge of the battery, the temperature of the battery, a real-time indicator of whether the battery is being subjected to operating currents, and the like.

In some examples, the visual indicator may include turning on or off one or more lights, displaying a message or sign via an output terminal, and the like. Furthermore, in some examples, the output terminal may be present in or associated with one or more controllers. It is also contemplated that in some examples each constituent battery of the battery pack may have a corresponding output terminal. In addition, in some examples, the output terminals may comprise LED lights, display screens, and the like.

In addition, in some examples, the controllers described herein may provide other types of feedback regarding the status and performance of the battery pack to an operator of the electrical device powered by the battery pack. For example, some types of batteries may reach a discharged or nonfunctional state of charge without significant drop in battery output prior to becoming discharged or nonfunctional. Examples of such types of batteries may include lithium ion batteries, and the like. The controllers described herein may be able to track the state of charge of the batteries, and regulate the output from such batteries such that the output declines as the battery gets closer to the state of discharge or non-functionality.

Such a decline may translate to a reduction in the performance of the electrical device powered by the battery pack. Such a decline in performance, in turn, may provide a functional or operating feedback to the operator of the device that the batteries or battery packs are reaching the state of discharge or non-functionality, and that it may be time to charge the battery pack.

For example, lithium ion batteries may be regulated or controlled to behave in a manner more similar to lead-acid batteries. This may be effected by reducing the output of a lithium-ion battery when the battery reaches down to about 10% or 15% of its capacity. This may cause a decline in the performance of the electrical device, and provide feedback to the operator of the device that it is time to recharge.

Furthermore, in some examples, in order to control the constituent batteries of the battery pack the controllers described herein may register constituent batteries or may otherwise track which constituent batteries are part of the battery pack. For example, a Layer Setting Service (LSS) fast scan may be performed by a controller to determine which batteries are connected to the battery pack. This type of scan may also be used to collect identifiers of the constituent batteries. If the battery is found not to have an identifier, the controller may assign an identifier to that battery.

In this manner, the controller may be able to identify or track, and control the constituent batteries of the battery pack. In some examples, obtaining the constituent battery identifier may then allow the controller to obtain information such as quality or operating characteristics about the constituent battery based on the identifier. Moreover, in some examples, the controller may track the performance of a given constituent battery and store such performance data in association with the identifier of that constituent battery. This performance data, in turn, may be used to generate models or predictions about the performance of a given constituent battery. Such predictions may include predictions of virtual voltages, and the like.

In some examples, the constituent batteries may provide information about their identity, quality, or performance to the controller without active steps or interventions by the controller. Examples of such information may include an identifier of the constituent battery, the underlying chemistry of the constituent battery, a voltage or state of charge of the constituent battery, the age or the number of charge/discharge cycles of the constituent battery, and the like. In such examples, the controller may be able to perform the methods and functions described herein without the need to send control signals to the constituent batteries. Such one-directional communication may reduce the amount of power, bandwidth, computational resources, and operational response times associated with the operation of the battery pack.

Figure 5:
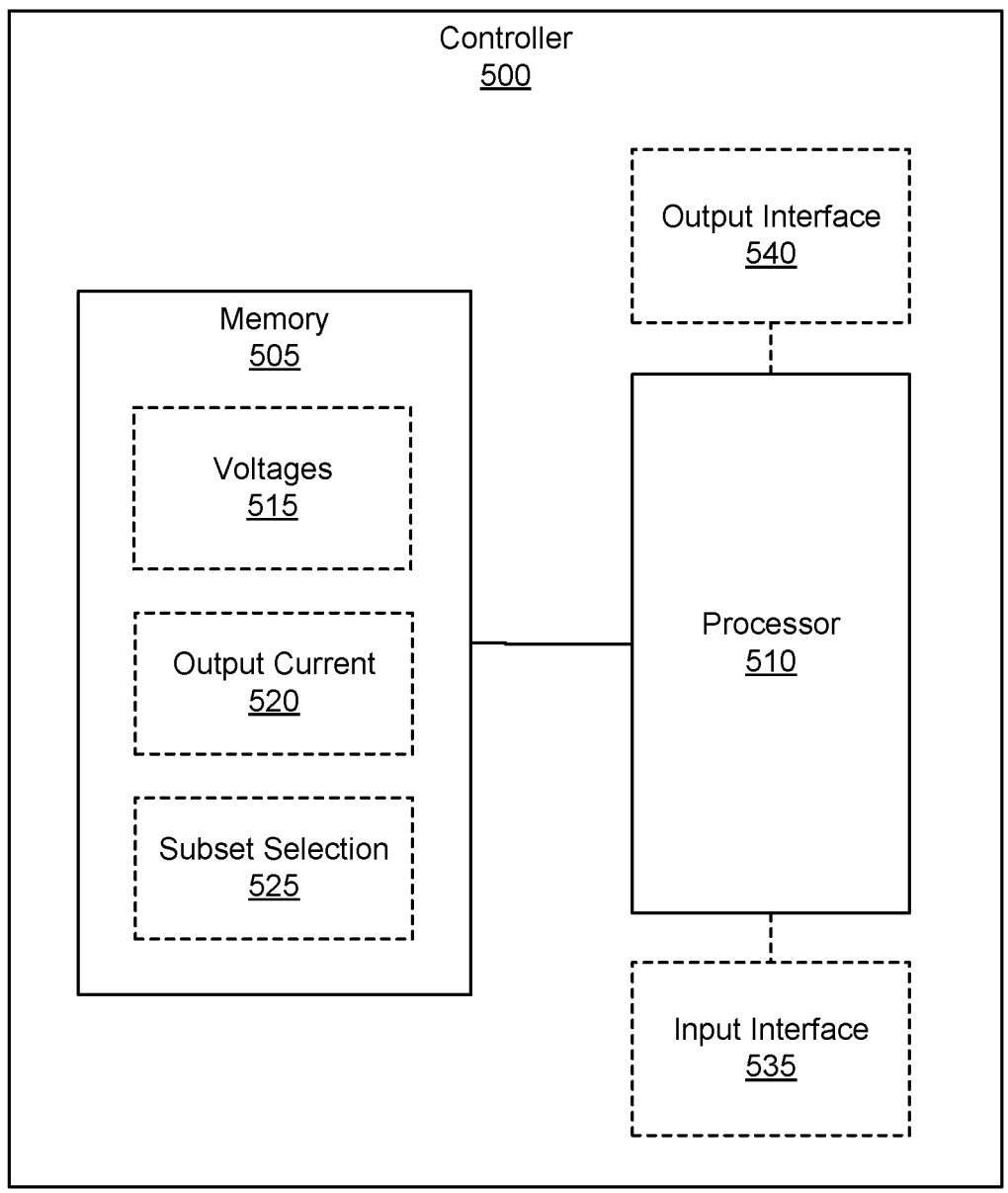
FIG. 5 shows a schematic representation of an example controller, in accordance with a non-limiting implementation of the present specification.

Turning now to FIG. 5, a schematic representation is shown of an example controller 500. In some examples, controller 500 may control a battery pack similar to the battery packs described herein. Furthermore, in some examples, controller 500 may be similar to or used as controller 105 of battery pack 100. In addition, in some examples, controller 500 may also be used as or be a part of battery pack 200, or the other battery packs described herein. In some examples controller 500 may be a free-standing component. Moreover, in some examples, controller 500 or its functionality may be incorporated into different components of the electric device. Examples of such components may include a universal or circuit controller, a motor controller, a BMS, and the like.

Controller 500 comprises a memory 505 to store instructions executable by a processor. Controller 500 also comprises a processor 510 in communication with memory 505. Controller 500 may have the features and perform the functions described in relation to method 300 and the other methods described herein.

Processor 510 may comprise a central processing unit (CPU), a graphics processing unit (GPU), a microcontroller, a microprocessor, a processing core, a field-programmable gate array (FPGA), or similar device capable of executing instructions. Processor 510 may cooperate with memory 505 to execute instructions.

Memory 505 may comprise a non-transitory machine-readable storage medium which may comprise an electronic, magnetic, optical, or other physical storage device that stores executable instructions. The machine-readable storage medium may include, for example, random access memory (RAM), read-only memory (ROM), electrically-erasable programmable read-only memory (EEPROM), flash memory, a storage drive, an optical disc, and the like. The machine-readable storage medium may be encoded with executable instructions.

In some examples, memory 505 may store voltages 515 of the constituent batteries of the battery pack controlled by controller 500. Memory 505 may also store an output current 520 to be output from the battery pack. Moreover, memory 505 may store a subset selection 525 indicating the identity of the selected batteries selected from among the batteries of the battery pack. Processor 510 may cooperate with memory 505 to carry out the methods or perform the functions described in association with method 300 and the related methods described herein.

For example, controller 500 may obtain voltages 515 of the batteries of the battery pack, and may also obtain output current 520 to be output from the battery pack. Processor 510 may then select a subset of the batteries capable collectively of providing output current 520. Such a selection may be stored in memory 505 as subset selection 525. The subset may comprise one or more selected batteries selected from among the plurality of the batteries of the battery pack. The subset may have a subset voltage being substantially similar to the voltages of each of the selected batteries. In some examples, the subset voltage may also be stored in memory 505. The subset may be selected such that the selected batteries have substantially similar voltages, and the subset voltage is minimized relative to the voltages of the batteries of the battery pack.

Processor 510 may then draw output current 520 from the subset of the batteries. In some examples controller 500 may directly cause output current 520 to be drawn from the selected batteries. Moreover, in some examples, processor 510 or controller 500 may generate control signals to cause another component of the battery pack or the corresponding electrical device to cause output current 520 to be drawn from the selected batteries.

In addition, in some examples controller 500 may comprise an input interface 535. In some examples, controller 500 may receive via input interface 535 magnitude of voltages 515 or the magnitude of output current 520. Moreover, in some examples, other types of information may be received via input interface 535 such as identifiers of the constituent batteries, quality or operating status indicators of the constituent batteries, and the like.

In FIG. 5 input interface 535 is depicted in dashed lines to signify that in some examples controller 500 need not comprise an input interface. In such examples the functions of the input interface may be performed by a different component of controller 500 or by an apparatus or system other than controller 500.

Moreover, in some examples controller 500 may also comprise an output interface 540. In some examples, controller 500 may communicate via output interface 540 with the other components on the circuit of the battery pack, such as constituent batteries, loads, sensors, other controllers, and the like. For example, controller 500 may communicate via output interface 540 control signals that may directly or indirectly cause various batteries of the battery pack to be subjected to operating currents or to discontinue being subjected to operating currents. Furthermore, in some examples, controller 500 may communicate other types of information via output interface 540, such as information regarding the status or performance of the battery pack or its constituent batteries, and the like.

In FIG. 5 output interface 540 is depicted in dashed lines to signify that in some examples controller 500 need not comprise an output interface. In such examples the functions of the output interface may be performed by a different component of controller 500 or by an apparatus or system other than controller 500.

It is also contemplated that in some examples controller 500 may comprise a housing (not shown) to which memory 505 and processor 510 may be directly or indirectly secured. In addition, in some examples input and output interfaces 535 and 540 may also be secured to the housing. Moreover, in FIG. 5 the boxes associated with voltages 515, output current 520, and subset selection 525 are depicted in dashed lines to indicate that in some examples voltages 515, output current 520, and subset selection 525 need not be stored in memory 505, and may be stored in a different memory in controller 500 or outside controller 500.

Figure 6:
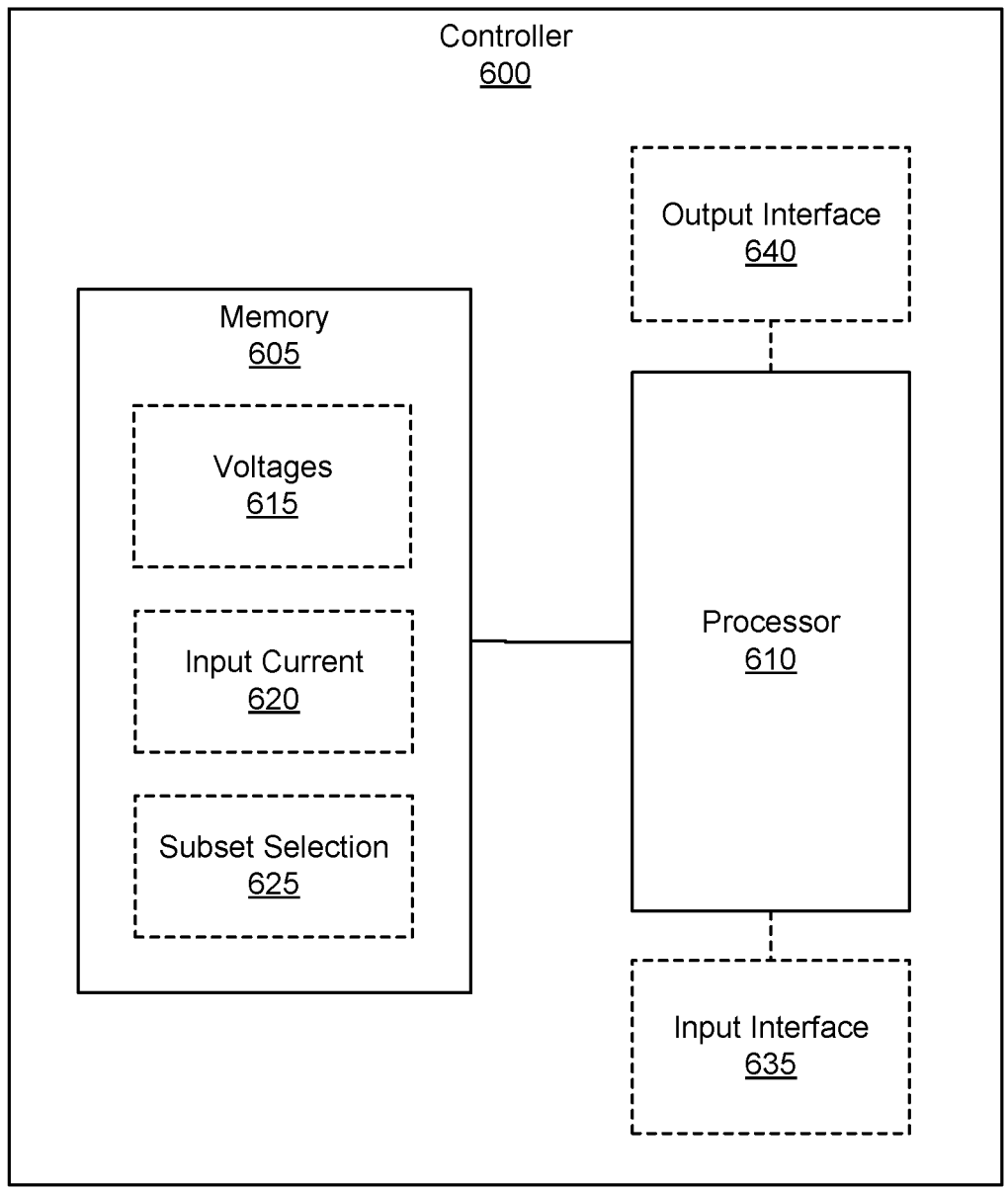
FIG. 6 shows a schematic representation of another example controller, in accordance with a non-limiting implementation of the present specification.

Turning now to FIG. 6, a schematic representation is shown of an example controller 600. In some examples, controller 600 may control a battery pack similar to the battery packs described herein. Furthermore, in some examples, controller 600 may be similar to or used as controller 105 of battery pack 100. In addition, in some examples, controller 600 may also be used as part of battery pack 200, or the other battery packs described herein. In some examples controller 600 may be a free-standing component. Moreover, in some examples, controller 600 or its functionality may be incorporated into different components of the electric device such as a universal or circuit controller, a motor controller, a BMS, and the like.

Controller 600 may be similar in structure or function to controller 500. A difference between controllers 500 and 600 is that controller 600 may perform the methods or have the functions of method 400 or the related methods described herein. In other words, controller 500 may control the discharging of the battery pack and controller 600 may control the charging of the battery pack.

Controller 600 comprises a memory 605 to store instructions executable by a processor. Controller 600 also comprises a processor 610 in communication with memory 605. Controller 600 may have the features and perform the functions described in relation to method 400 and the other methods described herein. Memory 605 may store voltages 615 of the constituent batteries of the battery pack controlled by controller 600. Memory 605 may also store an input current 620 to be used to charge the battery pack. In addition, memory 605 may store a subset selection 625 of the selected batteries of the battery pack.

Controller 600 may obtain voltages 615 for the batteries of the battery pack. In addition, controller 600 may receive or obtain input current 620 to be used to charge one or more of the batteries of the battery pack. Furthermore, processor 610 may select a subset of the batteries having a subset voltage. In some examples, the subset voltage may also be stored in memory 605. The subset may comprise one or more selected batteries selected from among the plurality of the batteries of the battery pack. The subset voltage may be substantially similar to the voltage of each of the selected batteries. Processor 610 may select the subset such that the selected batteries have substantially similar voltages. Moreover, in some examples, processor 610 may select the subset such that the subset voltage is minimized.

Processor 610 may also direct at least a portion of the input current to the subset of the batteries to charge the selected batteries. Processor 610 may control the directing of the portion of the input current directly or indirectly. It is also contemplated that in some examples the portion of the input current to be directed to the subset of the batteries may also be determined by processor 610 or stored in memory 605.

Controller 600 may also comprise an input interface 635 and an output interface 640. The structure or function of input interface 635 or output interface 640 may be similar or analogous to the structure or function of input interface 535 and output interface 540 respectively.

Figure 7:
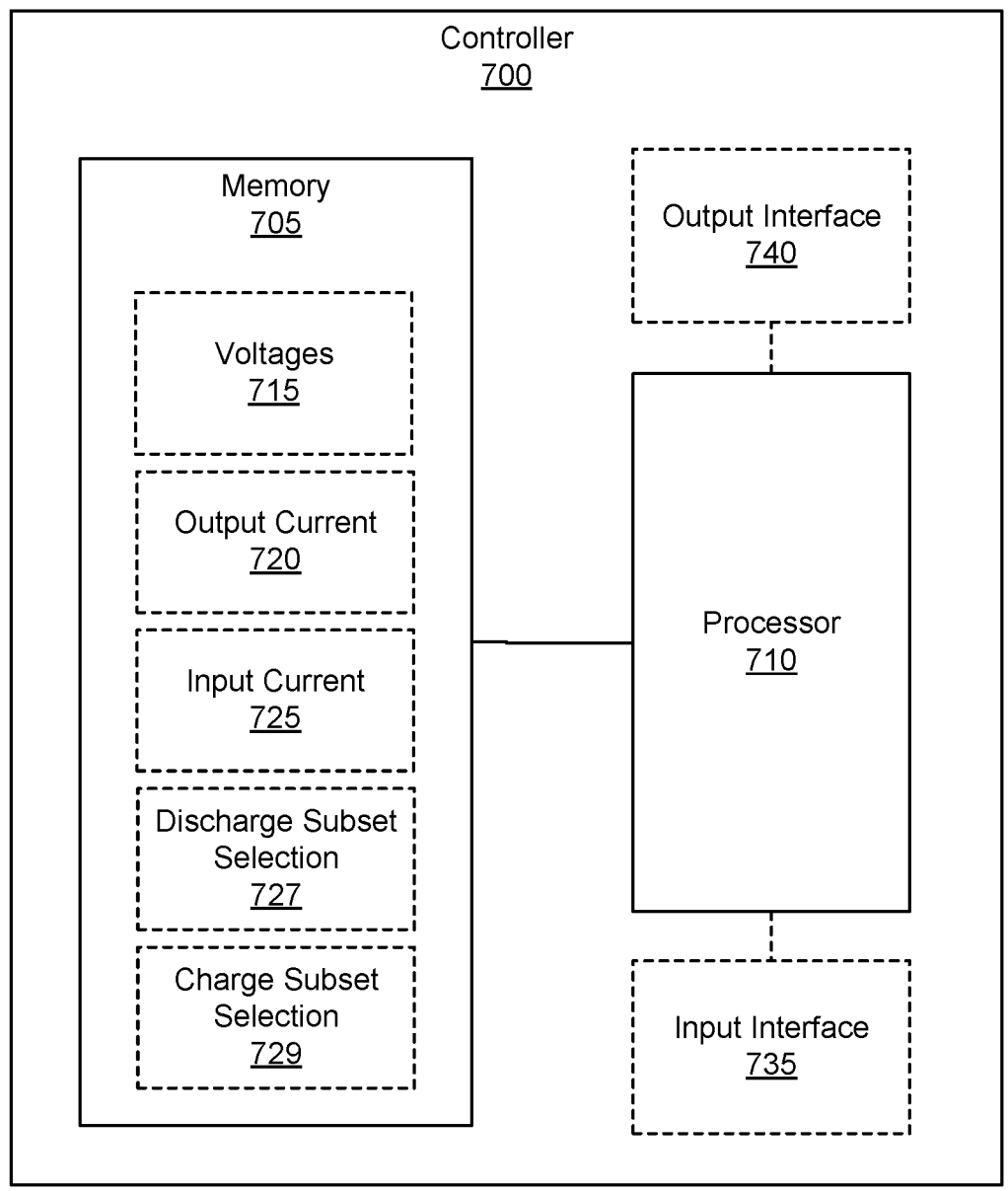
FIG. 7 shows a schematic representation of yet another example controller, in accordance with a non-limiting implementation of the present specification.

Turning now to FIG. 7, a schematic representation is shown of an example controller 700. In some examples, controller 700 may control a battery pack similar to the battery packs described herein. Furthermore, in some examples, controller 700 may be similar to or used as controller 105 of battery pack 100. In addition, in some examples, controller 700 may also be used as part of battery pack 200, or the other battery packs described herein. In some examples controller 700 may be a free-standing component. Moreover, in some examples, controller 700 or its functionality may be incorporated into different components of the electric device such as a universal or circuit controller, a motor controller, a BMS, and the like.

Controller 700 may be similar in structure or function to controllers 500 and 600. A difference between controller 700 and controllers 500 and 600 is that controller 700 may control both the discharging and the charging of the batteries of the battery pack. In other words, controller 700 may combine or perform the functionalities of both controllers 500 and 600. As such, controller 700 may perform the methods or have the functions described in relation to method 300, method 400, and their related methods described herein.

Controller 700 comprises a memory 705 to store instructions executable by a processor. Controller 700 also comprises a processor 710 in communication with memory 705. Controller 700 may have the features and perform the functions described in relation to methods 300, 400, and the other methods described herein. Memory 705 may store voltages 715 of the constituent batteries of a battery pack controlled by controller 700. Memory 705 may also store an output current 720 or an input current 725 to which the battery pack may be subjected. Memory 705 may also store a discharge subset selection 727 or a charge subset selection 729 of the selected batteries of the battery pack.

Discharge subset selection 727 may be the subset selection determined by processor 710 using methods and functions described in relation to method 300 and the related methods described herein. In addition, charge subset selection 729 may be the subset selection determined by processor 710 using methods and functions described in relation to method 400 and the related methods described herein.

Controller 700 may also comprise an input interface 735 and an output interface 740. The structure or function of input interface 735 or output interface 740 may be similar or analogous to the structure or function of input interfaces 535 and 635 and output interfaces 540 and 640 respectively.

Figure 8:
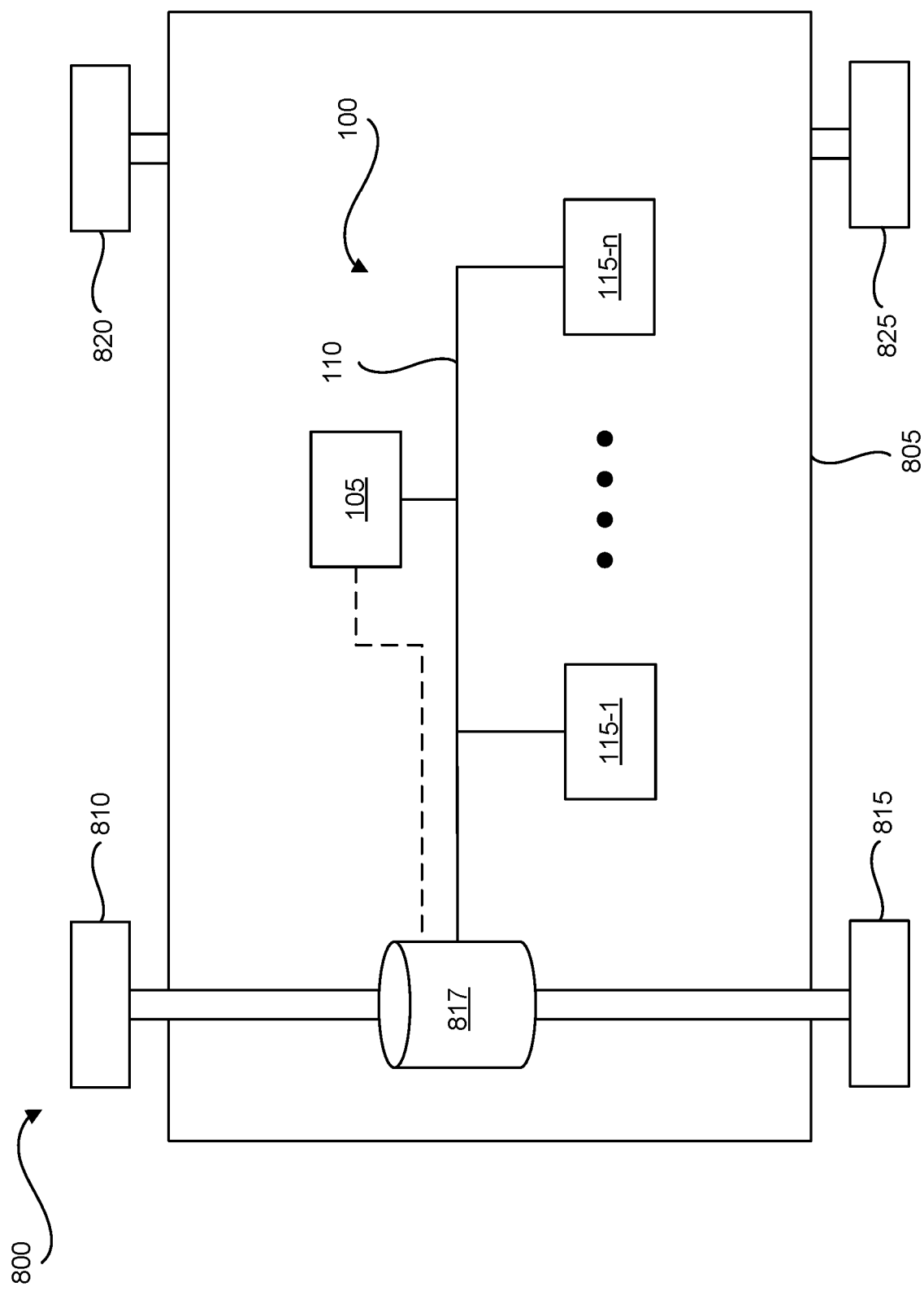
FIG. 8 shows a schematic representation of an example electric vehicle, in accordance with a non-limiting implementation of the present specification.

Turning now to FIG. 8, a schematic representation is shown of an example electric vehicle 800, which is powered by battery pack 100. Vehicle 800 comprises a chassis 805 and wheels 810, 815, 820, and 825. An electric motor 817 may be mechanically coupled to wheels 810 and 815 to power those wheels to move or drive vehicle 800. Battery pack 100 may be used to power motor 817 or the other electrically-powered components of vehicle 800. It is also contemplated that in some examples, controller 105 may be connected to motor 817 and may control motor 817 in addition to controlling batteries 115 of battery pack 100. It is also contemplated that in some examples, instead of or in addition to battery pack 100, vehicle 800 may include or be powered by battery pack 200 or the other battery packs described herein.

It is contemplated that in some examples, methods 300, 400, and the other methods described herein may be stored in non-transitory computer-readable storage media as machine-readable or computer-readable instructions. Such instructions, upon execution by a processor, may cause the processor to perform method 300, 400, or the other methods described herein.

It should be recognized that features and aspects of the various examples provided herein may be combined into further examples that also fall within the scope of the present disclosure.

The invention claimed is:

1. A method of operating a battery pack, the method comprising:
 obtaining voltages of batteries of the battery pack, the battery pack comprising a plurality of the batteries connected to a circuit;
 obtaining an output current to be output from the battery pack;
 selecting a subset of the batteries capable collectively of providing the output current, the subset comprising one or more selected batteries selected from among the plurality of the batteries, the subset having a subset voltage being substantially similar to a voltage of each of the selected batteries, the subset selected such that the selected batteries have substantially similar voltages and the subset voltage is maximized; and
 drawing the output current from the subset of the batteries.

2. The method of claim 1, wherein:
 the output current corresponds to a throttle input received at an electric vehicle powered by the battery pack; and
 the obtaining the output current comprises obtaining the throttle input.

3. The method of claim 1, wherein the drawing the output current from the subset of the batteries comprises:
 dividing the output current by the number of the selected batteries in the subset to yield a portion of the output current to be drawn from each selected battery; and
 drawing the portion of the output current from each selected battery.

4. The method of claim 1, wherein the drawing the output current from the subset of the batteries comprises:
 obtaining a discharge rate of each selected battery as a function of current drawn from each selected battery; and
 apportioning the output current between the selected batteries to maintain the discharge rates of the selected batteries substantially equal to one another.

5. The method of claim 1, wherein:
 the drawing the output current from the subset of the batteries alters the subset voltage to an altered subset voltage; and
 the battery pack comprises one or more non-selected batteries different from the selected batteries;
 the method further comprising:
 comparing corresponding voltages of the one or more non-selected batteries to the altered subset voltage; and
 adding the one or more non-selected batteries to the subset if the corresponding voltages of the one or more non-selected batteries is substantially equal to the altered subset voltage.

6. The method of claim 1, further comprising:
 detecting a change in the in the output current; and
 modifying a number of the selected batteries included in the subset of the batteries based on the change.

7. The method of claim 1, wherein:
 the voltage of each of the selected batteries comprises a corresponding virtual voltage; and
 the method further comprising:
 for each of the selected batteries, generating the virtual voltage based on an open circuit voltage for the selected battery and changes to the open circuit voltage caused by drawing a corresponding portion of the output current from the selected battery.

8. A method of operating a battery pack, the method comprising:
 obtaining voltages of batteries of the battery pack, the battery pack comprising a plurality of the batteries connected to a circuit;
 obtaining an input current to be used to charge one or more of the batteries;
 selecting a subset of the batteries having a subset voltage, the subset comprising one or more selected batteries selected from among the plurality of the batteries, the subset voltage being substantially similar to a voltage of each of the selected batteries, the subset selected such that the selected batteries have substantially similar voltages; and
 directing at least a portion of the input current to the subset of the batteries to charge the selected batteries.

9. The method of claim 8, wherein the selecting the subset of the batteries comprises selecting the subset of the batteries such that the subset voltage is minimized.

10. The method of claim 9, wherein:
 the subset comprises a plurality of the selected batteries; and
 the directing at least the portion of the input current to the subset of the batteries comprises apportioning the portion of the input current about equally among the selected batteries.

11. The method of claim 9, wherein the directing at least the portion of the input current to the subset of the batteries comprises:
obtaining a charging rate of each selected battery as a function of current directed to each selected battery; and
apportioning the input current between the selected batteries to maintain the charging rates of the selected batteries substantially equal to one another.

12. The method of claim 9, further comprising:
directing a remainder portion of the input current to one or more additional selected batteries of the battery pack, the additional selected batteries having corresponding voltages being next lowest after the subset voltage among the batteries of the battery pack.

13. The method of claim 9, wherein:
the directing the portion of the input current to the subset of the batteries alters the subset voltage to an altered subset voltage; and
the battery pack comprises one or more non-selected batteries different from the selected batteries;
the method further comprising:
comparing corresponding voltages of the one or more non-selected batteries to the altered subset voltage; and
adding the one or more non-selected batteries to the subset if the corresponding voltages of the one or more non-selected batteries is substantially equal to the altered subset voltage.

14. The method of claim 9, wherein:
the battery pack is used to power an electric vehicle; and
the directing at least the portion of the input current to the subset of the batteries comprises directing at least the portion of the input current associated with one or more of regenerative braking or charging associated with the electric vehicle.

15. The method of claim 9, wherein:
the voltage of each of the selected batteries comprises a corresponding virtual voltage; and
the method further comprising:
for each of the selected batteries, generating the virtual voltage based on an open circuit voltage for the selected battery and changes to the open circuit voltage caused by directing a corresponding portion of the input current into the selected battery.

16. The method of claim 9, wherein:
the battery pack is to power an electrical device having a minimum functionality;
the subset of the batteries comprises a first group of the batteries and a second group of the batteries, the first group selected such that when charged the first group is to power the electrical device to perform the minimum functionality; and
the directing the portion of the input current to the subset of the batteries comprises directing the portion of the input current to the first group first to charge the first group and then directing the portion of the input current to the second group.

17. The method of claim 8, wherein:
the battery pack is to power an electrical device having a minimum functionality;
the selecting the subset of the batteries comprises selecting the subset of the batteries such that:
when charged the selected batteries are to power the electrical device to perform the minimum functionality;
the number of the selected batteries is minimized; and
the subset voltage is maximized.

18. A controller for controlling operation of a battery pack, the controller comprising:
a memory to store instructions executable by a processor; and
the processor in communication with the memory, the processor to:
obtain voltages of batteries of the battery pack, the battery pack comprising a plurality of the batteries connected to a circuit;
obtain an output current to be output from the battery pack;
select a subset of the batteries capable collectively of providing the output current, the subset comprising one or more selected batteries selected from among the plurality of the batteries, the subset having a subset voltage being substantially similar to a voltage of each of the selected batteries, the subset selected such that the selected batteries have substantially similar voltages and the subset voltage is maximized; and
draw the output current from the subset of the batteries.

19. The controller of claim 18, wherein:
the output current corresponds to a throttle input received at an electric vehicle powered by the battery pack; and
to obtain the output current the processor is to obtain the throttle input.

20. The controller of claim 18, wherein to draw the output current from the subset of the batteries the processor is to:
divide the output current by the number of the selected batteries in the subset to yield a portion of the output current to be drawn from each selected battery; and
draw the portion of the output current from each selected battery.

21. The controller of claim 18, wherein to draw the output current from the subset of the batteries the processor is to:
obtain a discharge rate of each selected battery as a function of current drawn from each selected battery; and
apportion the output current between the selected batteries to maintain the discharge rates of the selected batteries substantially equal to one another.

22. The controller of claim 18, wherein:
the drawing the output current from the subset of the batteries alters the subset voltage to an altered subset voltage; and
the battery pack comprises one or more non-selected batteries different from the selected batteries; and
the processor is further to:
compare corresponding voltages of the one or more non-selected batteries to the altered subset voltage; and
add the one or more non-selected batteries to the subset if the corresponding voltages of the one or more non-selected batteries is substantially equal to the altered subset voltage.

23. The controller of claim 18, wherein the processor is further to:
detect a change in the in the output current; and
modify a number of the selected batteries included in the subset of the batteries based on the change.

24. The controller of claim 18, wherein:
the voltage of each of the selected batteries comprises a corresponding virtual voltage; and
the processor is further to:
for each of the selected batteries, generate the virtual voltage based on an open circuit voltage for the selected battery and changes to the open circuit voltage caused by drawing a corresponding portion of the output current from the selected battery.

25. A controller for controlling operation of a battery pack, the controller comprising:
a memory to store instructions executable by a processor; and
the processor in communication with the memory, the processor to:
obtain voltages of batteries of the battery pack, the battery pack comprising a plurality of the batteries connected to a circuit;
obtain an input current to be used to charge one or more of the batteries;
select a subset of the batteries having a subset voltage, the subset comprising one or more selected batteries selected from among the plurality of the batteries, the subset voltage being substantially similar to a voltage of each of the selected batteries, the subset selected such that the selected batteries have substantially similar voltages; and
direct at least a portion of the input current to the subset of the batteries to charge the selected batteries.

26. The controller of claim 25, wherein to select the subset of the batteries the processor is to select the subset of the batteries such that the subset voltage is minimized.

27. The controller of claim 26, wherein:
the subset comprises a plurality of the selected batteries; and
to direct at least the portion of the input current to the subset of the batteries the processor is to apportion the portion of the input current about equally among the selected batteries.

28. The controller of claim 26, wherein to direct at least the portion of the input current to the subset of the batteries the processor is to:
obtain a charging rate of each selected battery as a function of current directed to each selected battery; and
apportion the input current between the selected batteries to maintain the charging rates of the selected batteries substantially equal to one another.

29. The controller of claim 26, the processor is further to:
direct a remainder portion of the input current to one or more additional selected batteries of the battery pack, the additional selected batteries having corresponding voltages being next lowest after the subset voltage among the batteries of the battery pack.

30. The controller of claim 26, wherein:
the directing the portion of the input current to the subset of the batteries alters the subset voltage to an altered subset voltage; and
the battery pack comprises one or more non-selected batteries different from the selected batteries; and
the processor is further to:
compare corresponding voltages of the one or more non-selected batteries to the altered subset voltage; and
add the one or more non-selected batteries to the subset if the corresponding voltages of the one or more non-selected batteries is substantially equal to the altered subset voltage.

31. The controller of claim 26, wherein:
the battery pack is used to power an electric vehicle; and
to direct at least the portion of the input current to the subset of the batteries the processor is to direct at least the portion of the input current associated with one or more of regenerative braking or charging associated with the electric vehicle.

32. The controller of claim 26, wherein:
the voltage of each of the selected batteries comprises a corresponding virtual voltage; and
the processor is further to:
for each of the selected batteries, generate the virtual voltage based on an open circuit voltage for the selected battery and changes to the open circuit voltage caused by directing a corresponding portion of the input current into the selected battery.

33. The controller of claim 26, wherein:
the battery pack is to power an electrical device having a minimum functionality;
the subset of the batteries comprises a first group of the batteries and a second group of the batteries, the first group selected such that when charged the first group is to power the electrical device to perform the minimum functionality; and
to direct the portion of the input current to the subset of the batteries the processor is to direct the portion of the input current to the first group first to charge the first group and then directing the portion of the input current to the second group.

34. The controller of claim 25, wherein:
the battery pack is to power an electrical device having a minimum functionality;
to select the subset of the batteries the processor is to select the subset of the batteries such that:
when charged the selected batteries are to power the electrical device to perform the minimum functionality;
the number of the selected batteries is minimized; and
the subset voltage is maximized.

* * * * *